(12) United States Patent
Esposito et al.

(10) Patent No.: US 11,106,521 B2
(45) Date of Patent: Aug. 31, 2021

(54) FATAL ERROR LOGGING IN A MEMORY DEVICE

(71) Applicant: Micron Technology, Inc., Boise, ID (US)

(72) Inventors: Luigi Esposito, Piano di Sorrento (IT); Paolo Papa, Naples (IT); Massimo Iaculo, San Marco Evangelista (IT); Erika Morvillo, Naples (IT)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 16/544,269

(22) Filed: Aug. 19, 2019

(65) Prior Publication Data

US 2021/0055982 A1 Feb. 25, 2021

(51) Int. Cl.
*G06F 11/07* (2006.01)

(52) U.S. Cl.
CPC ...... *G06F 11/0778* (2013.01); *G06F 11/0727* (2013.01); *G06F 11/0751* (2013.01)

(58) Field of Classification Search
CPC ............. G06F 11/0778; G06F 11/0727; G06F 11/0751; G06F 11/0787; G06F 11/0781; G06F 11/0766; H04L 41/069; H04L 41/0806
See application file for complete search history.

(56) References Cited

U.S. PATENT DOCUMENTS

| | | | | |
|---|---|---|---|---|
| 6,519,725 | B1 * | 2/2003 | Huisman ................ | G11C 29/10 714/718 |
| 9,971,872 | B2 * | 5/2018 | Malinowski ........ | G06F 11/0727 |
| 10,437,754 | B1 * | 10/2019 | Ebisuzaki ........... | G06F 13/1668 |
| 2015/0026228 | A1 * | 1/2015 | Prohofsky ............... | H04L 67/10 709/201 |

* cited by examiner

*Primary Examiner* — Nadeem Iqbal
(74) *Attorney, Agent, or Firm* — Schwegman Lundberg & Woessner, P.A.

(57) ABSTRACT

Devices and techniques for fatal error logging in a memory device are described herein. For example a read request can be received for a component of the memory device. A fatal error indication of an error that prevents correct execution of read request can be detected. Diagnostic information for the failure indication can be collected. A response to the read request can then be made with a portion of the diagnostic information as payload instead of the user data that would have occupied the payload had the read succeeded. Metadata in the response can be used to communicate an error code.

24 Claims, 6 Drawing Sheets

FATAL ERROR LOGGING IN A MEMORY DEVICE

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storage cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.), SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
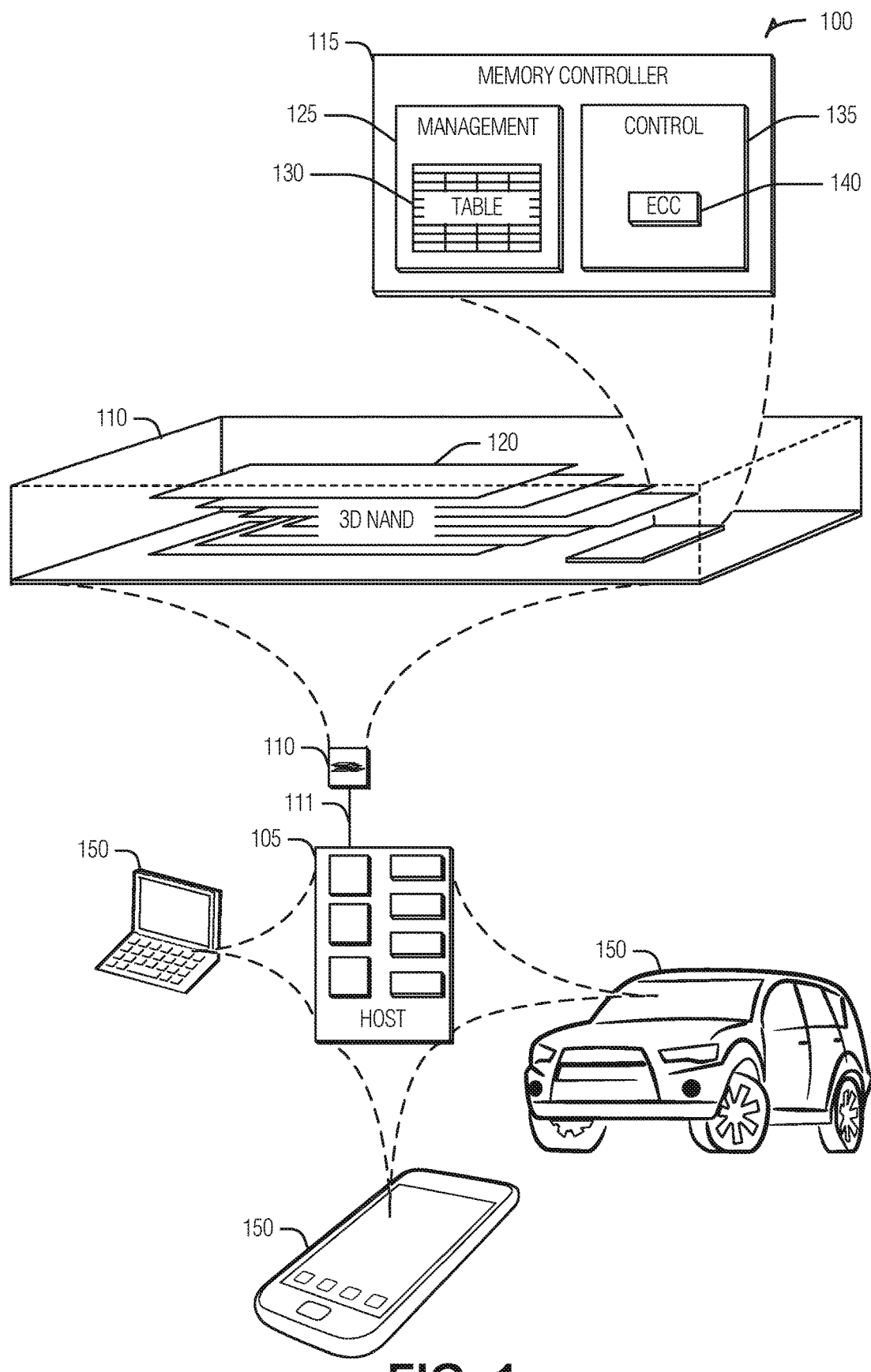
FIG. 1 illustrates an example of an environment including a memory device.

In the course of operation, it is possible that a memory device experiences a data integrity failure. The failure can be the result of a hardware failure or due to some corrupting influence, such as an extreme temperature or power fluctuations. Some of these failures result in errors that are not correctable by the memory device or by a host of the memory device.

Generally, when memory devices are confronted with an uncorrectable error attempting to fulfill a read request for a host, the memory device responds with whatever data it retrieved from the associated memory components along with an error code (e.g., error signal, or other indication that an error occurred and possibly what type of error). The host can then do what it will with the data—e.g., attempt to perform some advanced error recovery—as informed by the error code.

While the error code can be useful to ascertain what error occurred, it often does not indicate why the error occurred. To find why the error occurred, generally an advanced diagnostic is needed. The advanced diagnostic often involves either obtaining and running vendor specific diagnostic routines (e.g., taking advantage of a debug interface of the memory device using non-standard commands) or disassembling the memory device to perform additional investigations. In either case, it is likely that the memory device will not be available to provide storage and retrieval of data using functioning components. Further, disassembling the memory device to ascertain the cause of a failure can not only be prohibitively difficult in many situations, but the act of disassembling the memory device can lead to physical alterations in the memory device components which can mask the true cause of the failure.

To address the issues above, the memory device can perform diagnostic procedures in the event of an unrecoverable error. Diagnostic information generated from the diagnostic procedures can be transmitted to the host as payload in a response to the host request that corresponded to the unrecoverable error. In this way, the host can have access to the diagnostic information without invoking an additional debugging protocol that might not even be available.

It is possible that the diagnostic information is greater than the payload for the response to the request. To address this scenario, the diagnostic information can be packetized such that each packet fights within a payload. Each request by the host can result in a response with a new packet from the packetized diagnostic information. Thus, the standard request response protocol can be used to deliver sophisticated, and possibly large, diagnostic information to the host without impacting the interface or protocol normally used to communicate between the host and the memory device.

The fatal error logging described herein enables a memory device to dump diagnostic information when an unrecoverable failure occurs. This makes it possible to extract at least a first data packet of the diagnostic information at the moment of failure. Remaining diagnostic information can also be extracted with little effort if the host platform is able more times the failing read operation. The host error handling routine to retrieve this diagnostic information can be as simple as repeating the failed request (e.g., operation). This procedure can even be followed offline, by an operator, if the host is unable to perform the request. Thus, sophisticated diagnostic information is retrieved without changes to an interface or protocol between the host and the memory device. Additional details and examples are described below.

Figure 2:
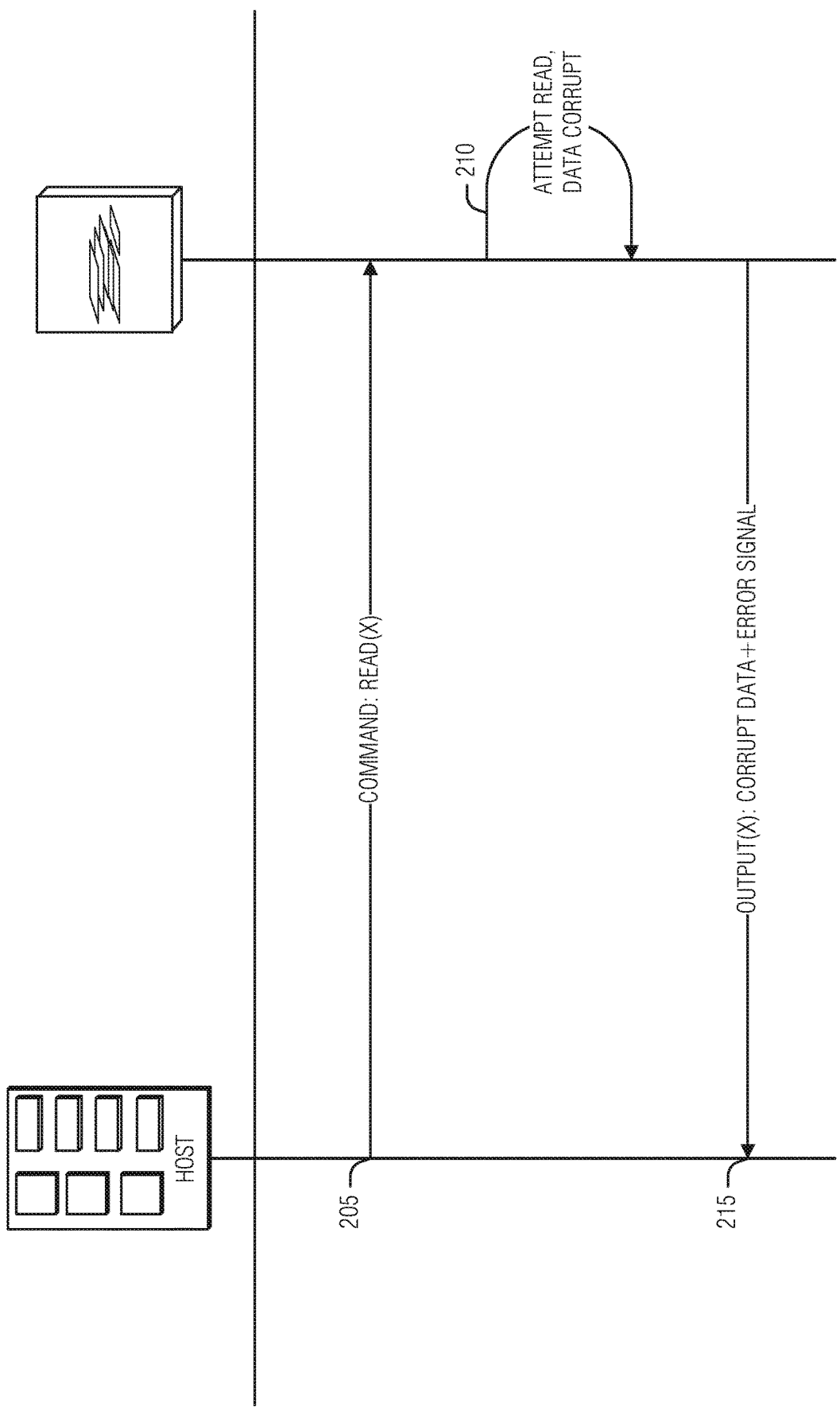
FIGS. 2, 3, and 4 illustrate examples of data flows of error logging communication between a memory device and a host.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150. FIG. 2 provides details more specific to the adjustable NAND write performance using pSLC encoding.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 600 of FIG. 6.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. Although the memory controller 115 is here illustrated as part of the memory device 110 package, other configurations can be employed, such as the memory controller 115 being a component of the host 105 (e.g., as a discrete package on a system-on-a-chip of the host 105 that is separate from the memory service 110), or even implemented via a central processing unit (CPU) of the host 105.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling, garbage collection, reclamation, error detection or correction, block retirement, or one or more other memory management functions. The memory manager 125 can parse or format host commands (e.g., commands received from a host) into device commands (e.g., commands associated with operation of the memory array 120, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a logical-to-physical (L2P) mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance can include removing (e.g., retiring) failing memory resources (e.g., memory cells, memory arrays, pages, blocks, etc.) to prevent future errors. RAIN is another technique that can be employed by the memory device 110 to maintain data integrity. The array controller 135 can be arranged to implement RAIN parity data generation and storage in the array 120. The memory controller 115 can be involved in using the parity data to reconstruct damaged data.

The memory controller 115 is also configured to provide fatal error logging for the memory device 110. As noted above, the technique involves the memory controller 110 capturing diagnostic information for a failure and providing it to the host 105 via the standard read-response mechanism of an interface between the host 105 and the memory device 110.

The memory controller 115 is configured to receive (e.g., via a communications interface of the memory controller 115) a first read request for a component of the memory device 110. Here, the component refers to a part of the array 120, such as a page, a block, a superblock, a die, etc. For example, the read request can refer to a page in a first die of four die in the array 120. Here, the component can refer to the die because the page is within the die. The exact scoping is variable for any given implementation because it depends upon the granularity within which diagnostic information can be obtained. Thus, if the array 120 can run block level diagnostics, then the component is a block.

The memory controller 115 is configured to obtain a fatal error indication in response to performance of the read request. Thus, the memory controller 115 infers a connection between the read request and the fatal error indication, such as the component of the read request is, or contains, the failing component.

A fatal error, as used herein, is an unrecoverable error as understood by the memory controller 115. Thus, either a sensor in the array 120, or in the memory controller 115 indicates the unrecoverable error. For example, the memory controller 115 can attempt the read. Error correction indicates that the read is corrupted. The memory controller 115 attempts to use the ECC bits to fix the error and fails. The memory controller 115 can then attempt one or more read-retry operations to resolve the problem. Having exhausted all options to recover the error, the memory controller 115 now has an indication that the error cannot be resolve, and in thus a fatal error. Conversely, if either the ECC or read-retry procedures managed to correct the error, then it would not be a fatal error. Accordingly, obtaining the failure indication includes any of receiving an interrupt from a sensor, querying and retrieving status information from the sensors, failing to successfully perform error recovery, etc.

The memory controller 115 is configured to collect diagnostic information on the hardware or software in response to the failure indication. In an example, the memory controller 115 includes debug circuitry to perform a diagnostic and collection the diagnostic information. Such debug circuitry can include probes, sensors, or other elements than can provide information on the nature of the data error. In an example, the memory controller 115 loads firmware to perform the diagnostic.

Although the memory controller 115 can be enabled to run the diagnostic, it is also possible for another entity, such as a component in the array 120, such as an on-die diagnostic element, to perform the diagnostic. In this example, the memory controller 115 is configured to query the component that performed the diagnostic to retrieve the diagnostic information, or the memory controller 115 is configured to accept the diagnostic information from the component when it is complete. In an example, the memory controller 115 is configured to initiate the component to perform the diagnostic in response to the fatal error indication.

As explained below, the diagnostic information is ultimately delivered to an entity external to the memory device 110, such as the host 105, as payload in a response to a request. Here, payload refers to the bits, symbols, or data segments reserved for the read data were the read quest successful as defined by an interface between the host 105 and the memory controller 115. Thus, in an example, considering a UFS Protocol Information Unit (UPIU), the payload is the data segment of the general UPIU format. The payload differs, however, from header data (e.g., flags, status, device information from the general UPIU format) or other metadata that would not otherwise be used to transfer the user data subject to the read request.

It is possible that the diagnostic information exceeds the payload size. To accommodate this, the diagnostic information is partitioned, or packetized, into units that will fit in the payload. Thus, in an example, the memory controller 115 is configured to packetize the diagnostic information. In an example, the packets of the diagnostic information are stored in working memory (e.g., SRAM or other volatile memory) of the memory controller 115, in the array 120, or both. This storage enables the complete diagnostic information to be ultimately recovered by the external entity.

Depending on the failure condition, in the case of packetized diagnostic information, there can be situations in which the entirety of the diagnostic information will not be extracted from the memory device 110, for example, due to a complete failure or the memory device 110 among other things. In scenarios such as this, it would be beneficial to ensure that the packets of the diagnostic information that are retrieved are the most useful. Thus, in an example, the memory controller 115 is configured to order portions of the diagnostic information in terms of importance. The criteria for determining whether the portions are important can be set via a parameter of the memory controller 115 or as part of the manufacture of the memory controller 115. The ordering of the portions of the diagnostic information can then be used to construct packets in which the first packet in an ordered sequence includes one or more portions that represent more important diagnostic data that in a second, or other subsequent, packet. Thus, when accessed by the external entity, the most important diagnostic information will be delivered first.

To avoid implementing a new interface between the host 105 and the memory device 115, the standard request-response protocol is maintained. However, the memory controller's response to a request is modified to contain at least a part of the diagnostic information as payload in the response rather than the traditional bits of corrupted data. Thus, the memory controller 115 is configured to respond to the read request with some or all of the diagnostic information as payload. In an example, an error code, signal, or indication can be included in the response as metadata (e.g., in a header, as a flag, etc.). Because the diagnostic information could be sensitive, in an example, the memory controller 115 is configured to encrypt the portion of the diagnostic information in the payload. Here, any appropriate encryption can be used.

In an example, where portions of the diagnostic information are ordered, the portion of the diagnostic information that is included in the payload has a highest importance of the portions of the diagnostic information. As noted above, this ensures that that the external entity, like the host 105, gets the most pertinent diagnostic information in the timeliest manner.

Figure 3:
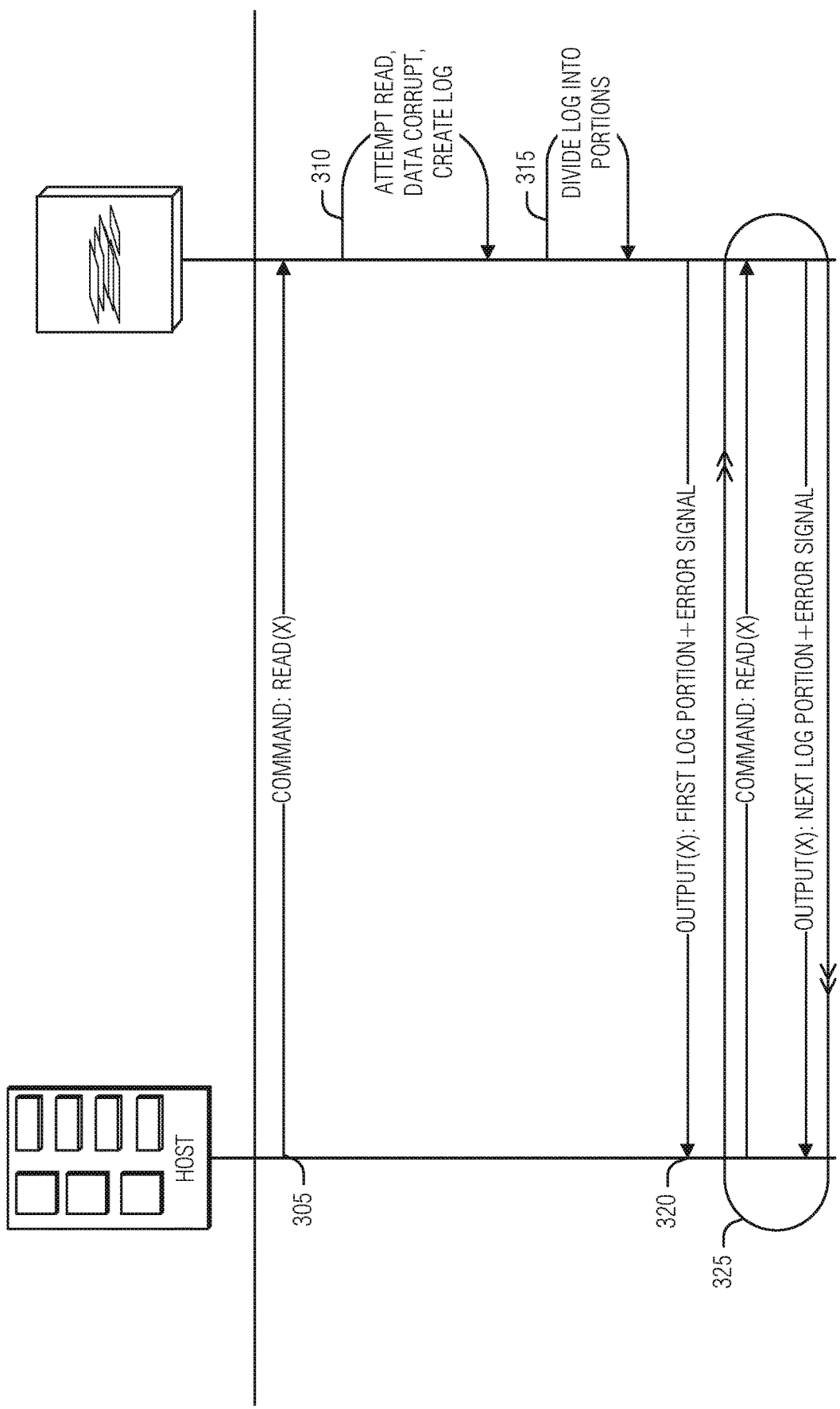

In an example, the second read request specifies the component. Here, a protocol to access diagnostic information specific to the component is used. For example, if the host 105 requested data from page A and a data error occurred, the host 105 can retrieve diagnostic information by again making the same request of page A (i.e., specifying the component page A). In an example, a response to each subsequent read request that specifies the component includes a new portion of the diagnostic information as payload. In an example, a third read request can be received and, in response to receiving the third read request, a second portion of the diagnostic information is sent as payload. By following this protocol, the host 105 would not, for example, receive diagnostic information for a different component when making a second request for page A, unless the fatal error affected both components. FIG. 3 illustrates an example of a data flow in accordance with this protocol.

Figure 4:
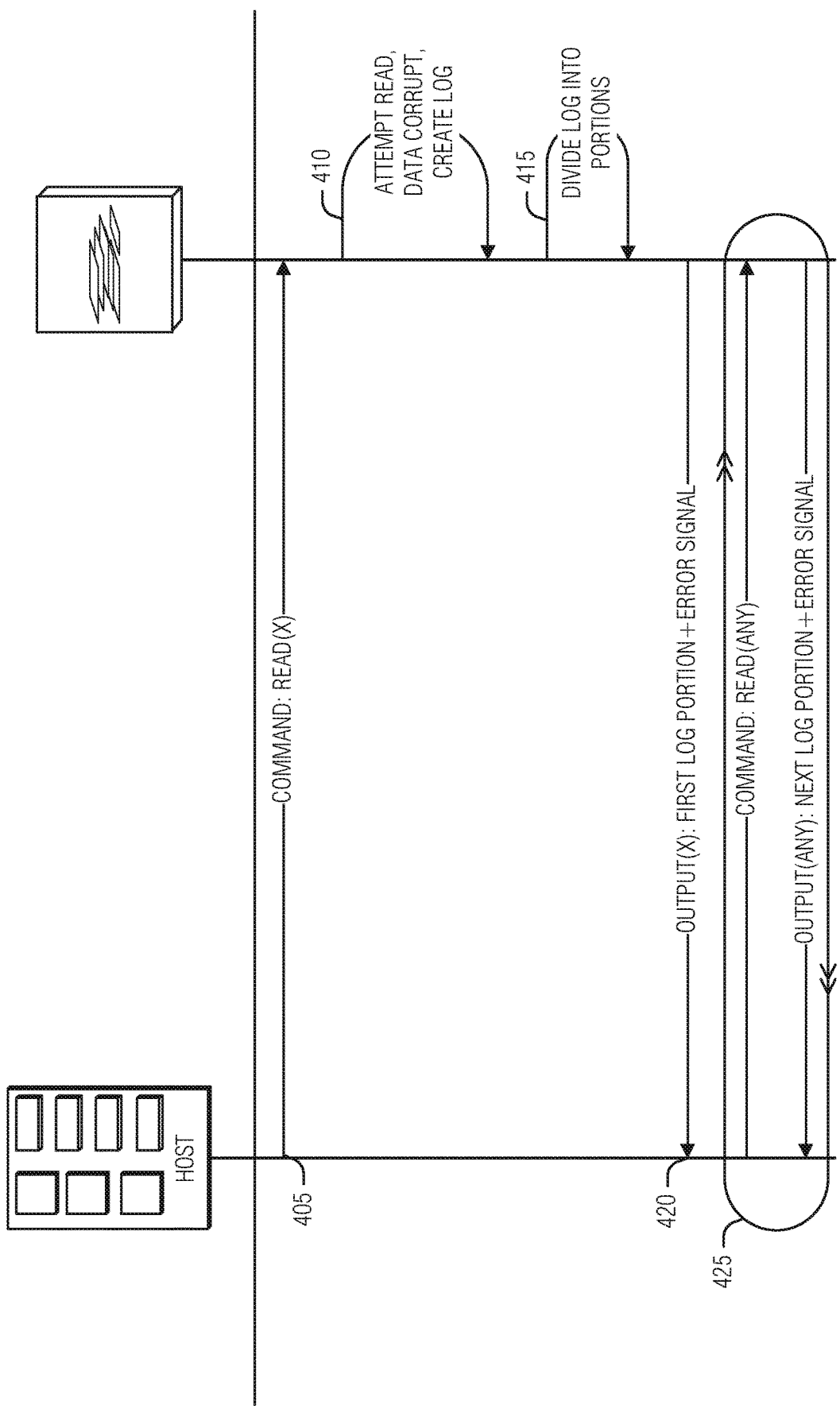

In an example, the second read request does not specify the component. In an example, each subsequent read request response includes a new portion of the diagnostic information as payload without regard to any component specified in a subsequent read request. Here, the memory controller 115 is configured to dole out the diagnostic information for any request. Such an arrangement can be more efficient when, for example, the data error affects the entire memory device 110, or the entire array 120. In an example, an error code for the response can be used by the memory controller 115 to signal that the payload is not the requested data, but rather diagnostic information. This can be useful when, for example, the host 105 received a fatal error indication on a first component request, and then performs a second request for a different component that the host 105 is unaware of being corrupted, or is in fact valid. Here, the advantage of delivering the diagnostic information includes clearing the working memory or array 120 cache of the diagnostic information. FIG. 4 illustrates an example of a data flow that corresponds to this protocol.

The protocols of specifying a component to get diagnostic information or receiving the diagnostic information when any component is specified, can be exclusive, or can be mixed. Thus, for example, the memory controller 115 can be configured to provide portions of the diagnostic information when the pertinent component is specified in a request. Then, when working memory is low, for example, the memory controller 115 is configured to switch to providing the remainder of the diagnostic information when any component is requested in order to clear the working memory cache. Conversely, the memory controller 115 can be configured to release the diagnostic information when any component is specified in order to more quickly deliver the pertinent diagnostic information, and then switch to the component specific protocol when, for example, portions of the diagnostic information above a threshold are delivered, or when operation of the memory device 110 stabilizes, among other criteria.

The memory array 120 can include several memory cells arranged in, for example, devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

FIGS. 2-4 illustrate examples of data flows of error logging communication between a memory device and a host. FIG. 2 illustrates a read operation 205 for data X being made by the host to the memory device. The memory device attempts to perform the read operation 205 and encounters a fatal error (operation 210). The memory device, in response to the fatal error, responds to the read operation with the corrupt data as payload along with an error code (e.g., error signal, error indication, etc.). The data flow illustrated in FIG. 2 represents a more traditional approach to fatal error logging in a memory device. In contrast, the data flows of FIGS. 3 and 4 provide diagnostic information in the response payload as opposed to the corrupt data.

FIG. 3 represents a data flow in which the host specifies which of possibly several sets of diagnostic information the host wants by continually specifying a component in subsequent requests. Thus, like the data flow of FIG. 2, the host makes a request to read data X (operation 305) and the memory device determines that the data is corrupt (operation 310). Now diverging from the flow of FIG. 2, the memory device also collects the diagnostic information pertaining to the fatal error in operation 310.

Here, conforming to a variation of memory device operation described above, the memory device partitions the diagnostic information at operation 315. In an example, the portions are equal to a response payload. In an example, the portions are smaller than a response payload. In an example, if smaller than a response payload, the portions are sized as a fixed ratio of the response payload, such as one half, one third, one quarter, one tenth, etc. A benefit that can accrue from portions smaller than the payload includes an ability to mix the portions. For example, if two different portions are evaluated under two different criteria, each being the highest ordered under different criteria, then both can be delivered in the response.

As illustrated, the first response to the request 305 includes the first portion of the log in lieu of the corrupted data illustrated in FIG. 2 (operation 320). an recurrence of request and response (loop 325) can then be used to retrieve the remaining portions of the diagnostic information, which each request specifying the data X, and each response delivering a next portion of the total portions of the diagnostic information.

The data flow of FIG. 4 operates in nearly the same manner as that illustrated in FIG. 3. The host executes a read command for data X (operation 405), the memory device attempts the read and creates diagnostic information when a fatal error is encountered (operation 410), the memory device divides the diagnostic information (415), and the memory device responds to the read 405 with a response (operation 420) that includes a first portion of the diagnostic information as payload. The loop 425 differs, however, from the loop 325 described above. Here, a subsequent command for any data, not just data X, results in a response with a payload that includes the next portion of the diagnostic information. Thus, for example, the first read in the loop 425 can be for data ABC, and the response to that read is a second portion of the diagnostic information generated at operation 410 in response to the read 405 for data X.

Figure 5:
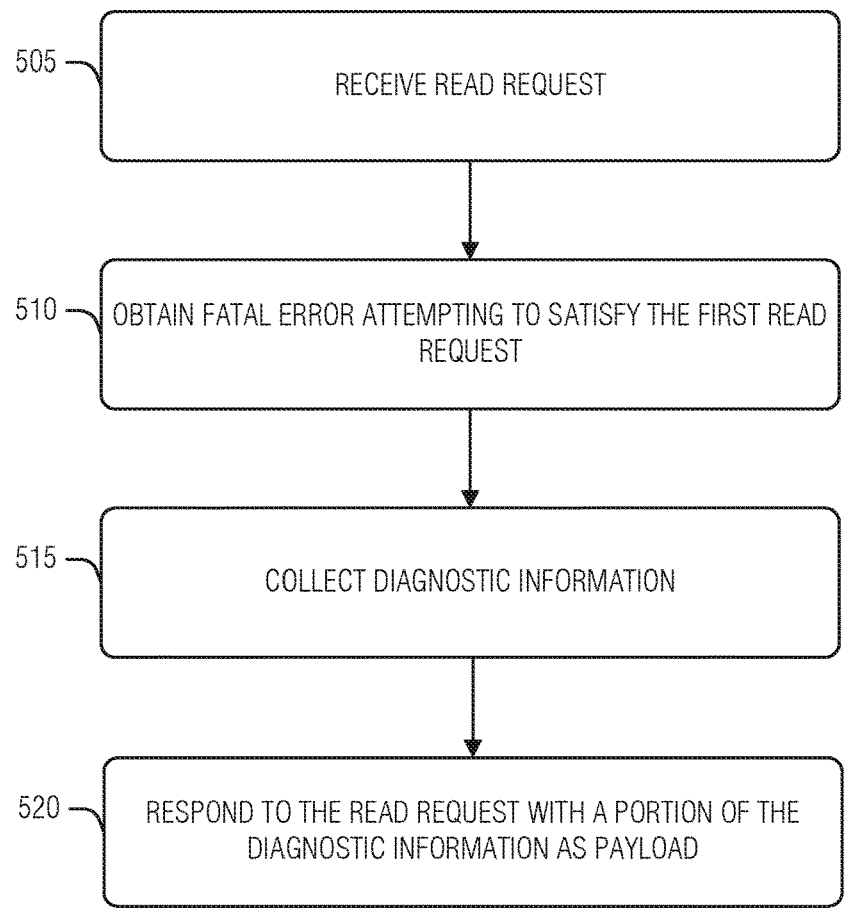
FIG. 5 illustrates a flowchart of an example of a method for fatal error logging in a memory device.

FIG. 5 illustrates a flowchart of an example of a method 500 for fatal error logging in a memory device. The operations of the method 500 are performed by computing hardware, such as that described above or below (e.g., the memory controller 115 or array controller 135 of FIG. 1, or other types of processing circuitry illustrated or described in FIGS. 1-4 and 6).

At operation 505, a read request for a component of the memory device is received.

At operation 510, a fatal error indication of an error that prevents correct execution of read request is detected.

At operation 515, diagnostic information for the failure indication is collected.

At operation 520, a response to the read request is made, the response including a portion of the diagnostic information as payload. In an example, the response includes metadata that includes an error code field, and wherein the value of the error code field corresponds to the fatal error.

In an example, portions of the diagnostic information are ordered by importance. Here, the portion of the diagnostic information sent in the first response has a highest importance. In an example, the portions are sent in order of importance for any further transmissions. In an example, the payload is encrypted.

The method 500 can be optionally extended to include receiving a second read request and responding to the second read request with a second portion of the diagnostic information as payload. In an example, the method 500 includes testing for the fatal error after receiving the second read request and responding to the second read request with the second portion of the diagnostic information in response to the testing indicating that the fatal error is ongoing. Here, the second response would not be sent if the testing indicates that the fatal error is no longer present. This enables a sensible restart of memory device operations if the fatal error resolves itself.

In an example, the second read request specifies the component. In an example, the fatal error includes the component but does not include a second component, wherein both the component and the second component are storage units of the memory device. In an example, the storage units are blocks. In an example, a response to each subsequent read request that specifies the component includes a new portion of the diagnostic information as payload.

In an example, the second read request does not specify the component. In an example, each subsequent read request response includes a new portion of the diagnostic information as payload without regard to any component specified in a subsequent read request.

Figure 6:
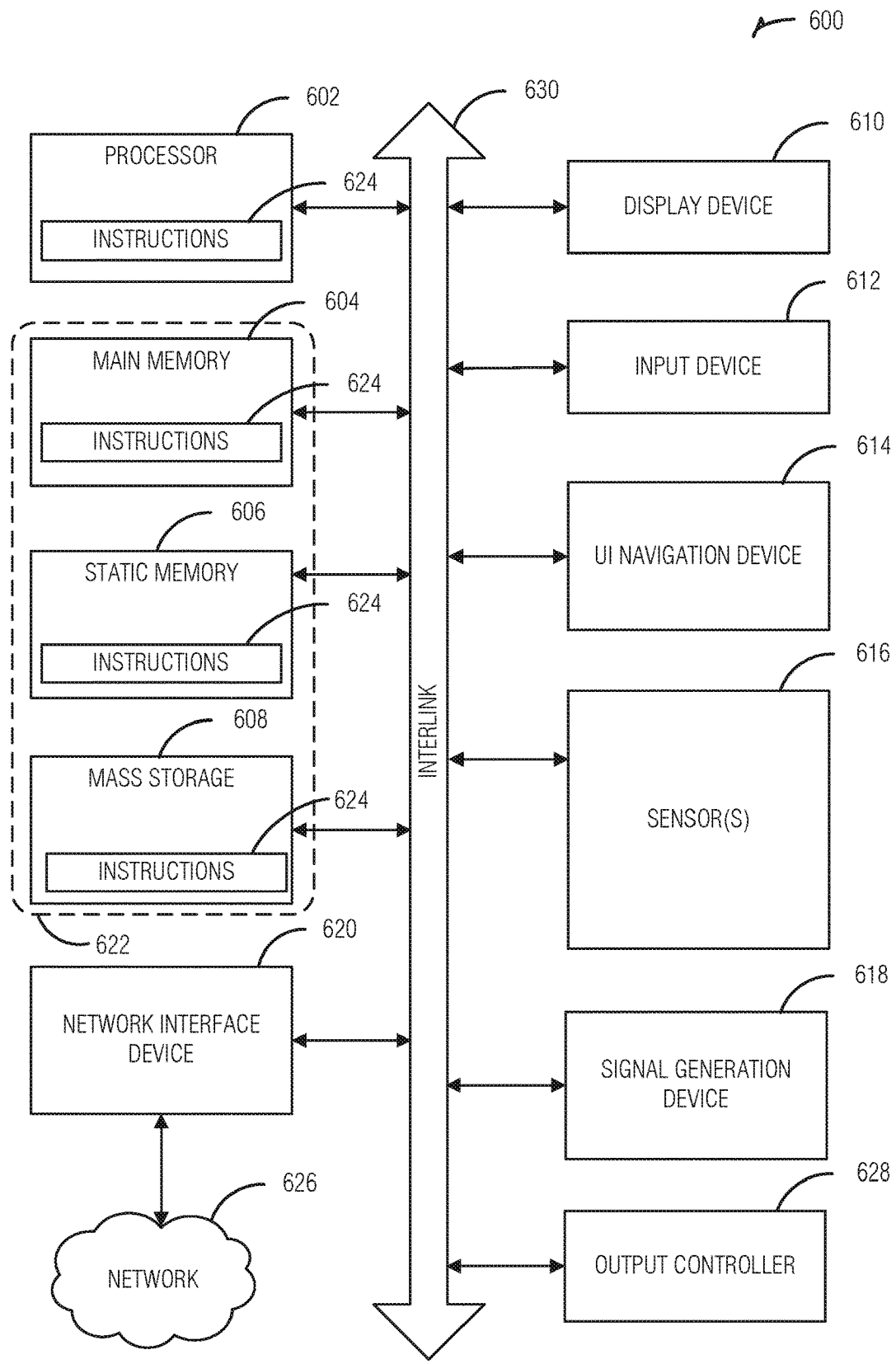
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 600 (e.g., the host device 105, the memory device 110, etc.) can include a hardware processor 602 (e.g., a central processing unit (CPU), a graphics processing unit (GPU), a hardware processor core, or any combination thereof, such as the memory controller 115, etc.), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 608 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 608 can constitute the machine readable medium 622.

While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data are stored on the storage device 621, can be accessed by the memory 604 for use by the processor 602. The memory 604 (e.g., DRAM) is typically fast, but volatile, and thus a different type of storage than the storage device 621 (e.g., an SSD), which is suitable for long-term storage, including while in an "off" condition. The instructions 624 or data in use by a user or the machine 600 are typically loaded in the memory 604 for use by the processor 602. When the memory 604 is full, virtual space from the storage device 621 can be allocated to supplement the memory 604; however, because the storage 621 device is typically slower than the memory 604, and write speeds are typically at least twice as slow as read speeds, use of virtual memory can greatly reduce user experience due to storage device latency (in contrast to the memory 604, e.g., DRAM). Further, use of the storage device 621 for virtual memory can greatly reduce the usable lifespan of the storage device 621.

In contrast to virtual memory, virtual memory compression (e.g., the Linux® kernel feature "ZRAM") uses part of the memory as compressed block storage to avoid paging to the storage device 621. Paging takes place in the compressed block until it is necessary to write such data to the storage device 621. Virtual memory compression increases the usable size of memory 604, while reducing wear on the storage device 621.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 600, and includes digital or analog communications signals or other intangible medium to facilitate communication of such software.

Additional Notes & Examples

Example 1 is an apparatus for fatal error logging in a memory device, the apparatus comprising: a communications interface to receive a read request for a component of the memory device; and processing circuitry to: detect a fatal error indication of an error that prevents correct execution of read request; collect diagnostic information for the failure indication; and respond to the read request, via the communications interface, with a portion of the diagnostic information as payload and metadata with an error code, wherein the payload are bits that would have been used for user data subject to the read request had the fatal error not occurred.

In Example 2, the subject matter of Example 1, wherein the communications interface is configured to receive a second read request; and wherein the processing circuitry is configured to respond to the second read request with a second portion of the diagnostic information as payload.

In Example 3, the subject matter of Example 2, wherein the processing circuitry is configured to: test for the fatal error after receiving the second read request; and respond to the second read request, via the communications interface, with the second portion of the diagnostic information in response to the testing indicating that the fatal error is ongoing.

In Example 4, the subject matter of any of Examples 2-3, wherein the second read request specifies the component.

In Example 5, the subject matter of Example 4, wherein the fatal error includes the component but does not include a second component, wherein both the component and the second component are storage units of the memory device.

In Example 6, the subject matter of Example 5, wherein the storage units are blocks.

In Example 7, the subject matter of any of Examples 4-6, wherein a response to each subsequent read request that specifies the component includes a new portion of the diagnostic information as payload.

In Example 8, the subject matter of any of Examples 2-7, wherein the second read request does not specify the component.

In Example 9, the subject matter of Example 8, wherein each subsequent read request response includes a new portion of the diagnostic information as payload without regard to any component specified in a subsequent read request.

In Example 10, the subject matter of any of Examples 1-9, wherein portions of the diagnostic information are ordered by importance, and wherein the portion of the diagnostic information has a highest importance.

In Example 11, the subject matter of any of Examples 1-10, wherein the payload is encrypted.

Example 12 is a method for fatal error logging in a memory device, the method comprising: receiving a read request for a component of the memory device; detecting a fatal error indication of an error that prevents correct execution of read request; collecting diagnostic information for the failure indication; and responding to the read request with a portion of the diagnostic information as payload and metadata with an error code, wherein the payload are bits that would have been used for user data subject to the read request had the fatal error not occurred.

In Example 13, the subject matter of Example 12, comprising: receiving a second read request; and responding to the second read request with a second portion of the diagnostic information as payload.

In Example 14, the subject matter of Example 13, comprising: testing for the fatal error after receiving the second read request; and responding to the second read request with the second portion of the diagnostic information in response to the testing indicating that the fatal error is ongoing.

In Example 15, the subject matter of any of Examples 13-14, wherein the second read request specifies the component.

In Example 16, the subject matter of Example 15, wherein the fatal error includes the component but does not include a second component, wherein both the component and the second component are storage units of the memory device.

In Example 17, the subject matter of Example 16, wherein the storage units are blocks.

In Example 18, the subject matter of any of Examples 15-17, wherein a response to each subsequent read request that specifies the component includes a new portion of the diagnostic information as payload.

In Example 19, the subject matter of any of Examples 13-18, wherein the second read request does not specify the component.

In Example 20, the subject matter of Example 19, wherein each subsequent read request response includes a new portion of the diagnostic information as payload without regard to any component specified in a subsequent read request.

In Example 21, the subject matter of any of Examples 12-20, wherein portions of the diagnostic information are ordered by importance, and wherein the portion of the diagnostic information has a highest importance.

In Example 22, the subject matter of any of Examples 12-21, wherein the payload is encrypted.

Example 23 is a machine-readable medium including instructions for fatal error logging in a memory device, the instructions, when executed by processing circuitry of the memory device, cause the processing circuitry to perform operations comprising: receiving a read request for a component of the memory device; detecting a fatal error indication of an error that prevents correct execution of read request; collecting diagnostic information for the failure indication; and responding to the read request with a portion of the diagnostic information as payload and metadata with an error code, wherein the payload are bits that would have been used for user data subject to the read request had the fatal error not occurred.

In Example 24, the subject matter of Example 23, wherein the operations comprise: receiving a second read request; and responding to the second read request with a second portion of the diagnostic information as payload.

In Example 25, the subject matter of Example 24, wherein the operations comprise: testing for the fatal error after receiving the second read request; and responding to the second read request with the second portion of the diagnostic information in response to the testing indicating that the fatal error is ongoing.

In Example 26, the subject matter of any of Examples 24-25, wherein the second read request specifies the component.

In Example 27, the subject matter of Example 26, wherein the fatal error includes the component but does not include a second component, wherein both the component and the second component are storage units of the memory device.

In Example 28, the subject matter of Example 27, wherein the storage units are blocks.

In Example 29, the subject matter of any of Examples 26-28, wherein a response to each subsequent read request that specifies the component includes a new portion of the diagnostic information as payload.

In Example 30, the subject matter of any of Examples 24-29, wherein the second read request does not specify the component.

In Example 31, the subject matter of Example 30, wherein each subsequent read request response includes a new portion of the diagnostic information as payload without regard to any component specified in a subsequent read request.

In Example 32, the subject matter of any of Examples 23-31, wherein portions of the diagnostic information are ordered by importance, and wherein the portion of the diagnostic information has a highest importance.

In Example 33, the subject matter of any of Examples 23-32, wherein the payload is encrypted.

Example 34 is a system for fatal error logging in a memory device, the system comprising: means for receiving a read request for a component of the memory device; means for detecting a fatal error indication of an error that prevents correct execution of read request; means for collecting diagnostic information for the failure indication; and means for responding to the read request with a portion of the diagnostic information as payload and metadata with an error code, wherein the payload are bits that would have been used for user data subject to the read request had the fatal error not occurred.

In Example 35, the subject matter of Example 34, comprising: means for receiving a second read request; and means for responding to the second read request with a second portion of the diagnostic information as payload.

In Example 36, the subject matter of Example 35, comprising: means for testing for the fatal error after receiving the second read request; and means for responding to the second read request with the second portion of the diagnostic information in response to the testing indicating that the fatal error is ongoing.

In Example 37, the subject matter of any of Examples 35-36, wherein the second read request specifies the component.

In Example 38, the subject matter of Example 37, wherein the fatal error includes the component but does not include a second component, wherein both the component and the second component are storage units of the memory device.

In Example 39, the subject matter of Example 38, wherein the storage units are blocks.

In Example 40, the subject matter of any of Examples 37-39, wherein a response to each subsequent read request that specifies the component includes a new portion of the diagnostic information as payload.

In Example 41, the subject matter of any of Examples 35-40, wherein the second read request does not specify the component.

In Example 42, the subject matter of Example 41, wherein each subsequent read request response includes a new portion of the diagnostic information as payload without regard to any component specified in a subsequent read request.

In Example 43, the subject matter of any of Examples 34-42, wherein portions of the diagnostic information are ordered by importance, and wherein the portion of the diagnostic information has a highest importance.

In Example 44, the subject matter of any of Examples 34-43, wherein the payload is encrypted.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or n" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An apparatus for fatal error logging in a memory device, the apparatus comprising:
 a communications interface to receive a read request for a component of the memory device; and
 processing circuitry to:
  detect a fatal error indication of an error that prevents correct execution of the read request;
  collect diagnostic information for the failure indication; and
  respond to the read request, via the communications interface, with a portion of the diagnostic information as payload and metadata with an error code, wherein the payload are bits that would have been used for user data from the component subject to the read request had the fatal error not occurred.

2. The apparatus of claim 1, wherein the communications interface is configured to receive a second read request; and wherein the processing circuitry is configured to respond to the second read request with a second portion of the diagnostic information as payload.

3. The apparatus of claim 2, wherein the second read request specifies the component.

4. The apparatus of claim 3, wherein the fatal error includes the component but does not include a second component, wherein both the component and the second component are storage units of the memory device.

5. The apparatus of claim 3, wherein a response to each subsequent read request that specifies the component includes a new portion of the diagnostic information as payload.

6. The apparatus of claim 2, wherein the second read request does not specify the component.

7. The apparatus of claim 6, wherein each subsequent read request response includes a new portion of the diagnostic information as payload without regard to any component specified in a subsequent read request.

8. The apparatus of claim 1, wherein portions of the diagnostic information are ordered by importance, and wherein the portion of the diagnostic information has a highest importance.

9. A method fatal error logging in a memory device, the method comprising:
 receiving a read request for a component of the memory device;
 detecting a fatal error indication of an error that prevents correct execution of the read request;
 collecting diagnostic information for the failure indication; and
 responding to the read request with a portion of the diagnostic information as payload and metadata with an error code, wherein the payload are bits that would have been used for user data from the component subject to the read request had the fatal error not occurred.

10. The method of claim 9, comprising:
 receiving a second read request; and
 responding to the second read request with a second portion of the diagnostic information as payload.

11. The method of claim 10, wherein the second read request specifies the component.

12. The method of claim 11, wherein the fatal error includes the component but does not include a second component, wherein both the component and the second component are storage units of the memory device.

13. The method of claim 11, wherein a response to each subsequent read request that specifies the component includes a new portion of the diagnostic information as payload.

14. The method of claim 10, wherein the second read request does not specify the component.

15. The method of claim 14, wherein each subsequent read request response includes a new portion of the diagnostic information as payload without regard to any component specified in a subsequent read request.

16. The method of claim 9, wherein portions of the diagnostic information are ordered by importance, and wherein the portion of the diagnostic information has a highest importance.

17. A non-transitory machine-readable medium including instructions for fatal error logging in a memory device, the instructions, when executed by processing circuitry of the memory device, cause the processing circuitry to perform operations comprising:
 receiving a read request for a component of the memory device;
 detecting a fatal error indication of an error that prevents correct execution of the read request;
 collecting diagnostic information for the failure indication; and
 responding to the read request with a portion of the diagnostic information as payload and metadata with an error code, wherein the payload are bits that would have been used for user data from the component subject to the read request had the fatal error not occurred.

18. The non-transitory machine-readable medium of claim 17, wherein the operations comprise:
 receiving a second read request; and
 responding to the second read request with a second portion of the diagnostic information as payload.

19. The non-transitory machine-readable medium of claim 18, wherein the second read request specifies the component.

20. The non-transitory machine-readable medium of claim 19, wherein the fatal error includes the component but does not include a second component, wherein both the component and the second component are storage units of the memory device.

21. The non-transitory machine-readable medium of claim 19, wherein a response to each subsequent read request that specifies the component includes a new portion of the diagnostic information as payload.

22. The non-transitory machine-readable medium of claim 18, wherein the second read request does not specify the component.

23. The non-transitory machine-readable medium of claim 22, wherein each subsequent read request response includes a new portion of the diagnostic information as payload without regard to any component specified in a subsequent read request.

24. The non-transitory machine-readable medium of claim 17, wherein portions of the diagnostic information are ordered by importance, and wherein the portion of the diagnostic information has a highest importance.

* * * * *